(12) United States Patent
Valdes et al.

(10) Patent No.: US 10,607,800 B1
(45) Date of Patent: Mar. 31, 2020

(54) POWERLINE CUTOUT SWITCH IMPROVEMENT

(71) Applicant: POWER SAFETY INNOVATIONS, LLC, Miami, FL (US)

(72) Inventors: Jamel Valdes, Miami, FL (US);
Roberto Rodriguez, Miami, FL (US);
Alberto Reyes, Hialeah, FL (US);
Emilio Castro, Miami, FL (US)

( * ) Notice: Subject to any disclaimer, the term of this patent is extended or adjusted under 35 U.S.C. 154(b) by 0 days.

(21) Appl. No.: 16/193,694

(22) Filed: Nov. 16, 2018

(51) Int. Cl.
*H02G 1/04* (2006.01)
*H01H 85/20* (2006.01)
*H01H 85/02* (2006.01)

(52) U.S. Cl.
CPC .... *H01H 85/2045* (2013.01); *H01H 85/0241* (2013.01); *H01H 85/205* (2013.01); *H02G 1/04* (2013.01); *H01H 2085/0291* (2013.01); *H01H 2085/206* (2013.01); *H01H 2207/016* (2013.01)

(58) Field of Classification Search
CPC ........... H01H 85/2045; H01H 85/0241; H01H 85/205; H01H 2085/0291; H01H 2085/206; H01H 2207/016; H02G 1/04
USPC ....................................................... 361/623
See application file for complete search history.

(56) References Cited

U.S. PATENT DOCUMENTS

| | | | | |
|---|---|---|---|---|
| 4,307,369 A | * | 12/1981 | Jackson, Jr. | ........... H01H 85/38 337/273 |
| 4,414,527 A | * | 11/1983 | Biller | ................... H01H 31/127 337/169 |
| 6,078,008 A | | 6/2000 | Wood et al. | |
| 6,232,676 B1 | * | 5/2001 | Kozyra | ............... G06F 13/4081 307/113 |
| 6,462,639 B1 | | 10/2002 | Farag et al. | |
| 6,474,197 B1 | * | 11/2002 | Browen | ............. H01H 85/0208 294/174 |

* cited by examiner

*Primary Examiner* — Mandeep S Buttar
(74) *Attorney, Agent, or Firm* — Sanchelima & Associates, P.A.; Christian Sanchelima; Jesus Sanchelima

(57) ABSTRACT

The present invention is a power line cut-out switch used in power transmission system comprising a base member having a vertical extension member perpendicularly attached thereon that secures a mechanical jumper used when transferring power lines from one electrical post to another. The vertical member can include a mushroom top member to further secure the mechanical jumper. The mechanical jumper is mounted to the vertical extension member to provide a stable and secure point of engagement when transferring power lines. This avoids electrocution to workers by no longer having to connect the mechanical jumper to flimsy solid jumpers and helps provide more uninterrupted power supply to consumers when installing new posts or shifting old posts to a new location.

8 Claims, 8 Drawing Sheets

POWERLINE CUTOUT SWITCH IMPROVEMENT

BACKGROUND OF THE INVENTION

1. Field of the Invention

The present disclosure relates to a power line cut-out switch. More particularly, the present disclosure relates to a power line cut-out switch having a vertical extension member for securing mechanical jumper, instead of mounting mechanical jumper to solid jumper of cut-out switch.

2. Description of the Related Art

The power distribution system has a cutout switch to protect various apparatus, such as transformers, from electrical overload or any other electrical disturbance. In case of electrical overload, fuse in cutout switch melts to opens the connection, thereby protecting various apparatus connected to the distribution system.

Applicant believes that a related reference corresponds to U.S. Pat. No. 6,078,008A filed by UTILITY SOLUTIONS Inc. for a portable load-breaking and load returning apparatus. The UTILITY SOLUTIONS Inc. reference discloses a load-breaking and load-returning apparatus and method of breaking and returning a load are provided for quickly breaking and returning a load to portions of a power line. The apparatus or cutout switch has a solid jumper that is a connected from the primary voltage power lines to the cutout switch. When a power company needs to change posts a second mechanical jumper has to be installed in parallel to prevent a power outage when removing a solid jumper. This is to be able to move the power lines to a new post.

Applicant believes that a related reference corresponds to U.S. Pat. No. 6,462,639B1 filed by Hubbell Inc. for fuse cutout with dome top contact and knurled fuse holder cap. The Hubbell Inc. reference discloses a fuse cutout for connection to a power source includes a mounting having upper and lower support members extending from opposing ends of the mounting. The upper support member includes a first contact having opposing first and second end portions, with the first end portion being attached to the upper support member, and a dome portion disposed between the first and second end portions. The dome portion includes opposing first and second dome surfaces and a first ridge extending along the second dome surface. A holder member is fixedly attached to the lower support member of the mounting. A pivot member is received in the holder member at a first pivot point, the pivot member being movable between first and second positions. A fuse holder is movable between closed and open positions and has upper and lower ends. The lower end is pivotally coupled to the pivot member at a second pivot point. The upper end has an engagement surface for engaging the first ridge of the dome portion of the first contact of the mounting forming an electrical connection therewith.

The prior art does not provide any solid or stable structure for mechanical jumper 21 to connect to. The prior art requires that the mechanical jumper 21 be connected to solid jumper 34. This is an unstable means of changing electrical posts because the solid jumpers are typically made of thin copper and sometimes break when mechanical jumpers are attached to them. This can cause electrocution or power interruption.

FIG. 1 represents an isometric view of the prior art a cut-out switch 6 of a power transmission system 10 installed in a post 12. Cut-out switch 6 is mounted to a solid jumper 13 on a first end using clamp 5. Solid jumper 13 is connected to the power line 3 at its second end. The voltage from power line 3 may be supplied to transformer 7 using cutout switch 6. Power from other power lines 1 and 2 (not shown) can also be connected to the transformer 7 to step down the power. Cutout switch 6 can be insulated using suitable means of insulation 16. The step downed power can be supplied to homes for domestic purpose using cable 8. In some situations, when the clamp 5 is damaged power transmission to end users can be interrupted. A need therefore exists to secure a second cable such as a mechanical jumper to the cutout switch or a more secure means to attach and reattach the solid jumper 13 to retain power transmission to homes when moving, changing or upgrading electrical posts.

Other documents describing the closest subject matter provide for a number of more or less complicated features that fail to solve the problem in an efficient and easy way. None of these patents suggest the novel features of the present invention.

SUMMARY OF THE INVENTION

It is an object of the present invention to provide a power line cut-out switch. The present disclosure relates to a power line cut-out switch having a vertical extension member for securing mechanical jumper, instead of mounting mechanical jumper to solid jumper of cut-out switch.

It is an object of the present invention to provide a power line cut-out switch comprising a base member having a vertical extension perpendicularly attached thereon. The vertical extension member includes mushroom top member to secure a mechanical jumper, which is to be attached to a power line.

It is yet another object of the present invention to provide a power line cut-out switch, wherein the mechanical jumper is securely connected to a vertical extension member that is more solid than connecting it to a solid jumper.

It is yet another object of the present invention to provide a power line cut-out switch, wherein one end of mechanical jumper can be attached to a power line other end can be secured either to proximal end of vertical extension member using securing means or to mushroom top member. Instead of securing mechanical jumper to clamp, mechanical jumper is secured to mushroom top member or proximal end of vertical extension member. This avoids damage of mechanical jumper, when clamp is damaged, and provides uninterrupted power supply to consumers/customers, while installing new post or shifting old post to other location.

It is still another object of the present invention to provide a power line cut-out switch which is used when posts need to be occasionally replaced with another post at a predetermined distance.

Further objects of the invention will be brought out in the following part of the specification, wherein detailed description is for the purpose of fully disclosing the invention without placing any limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
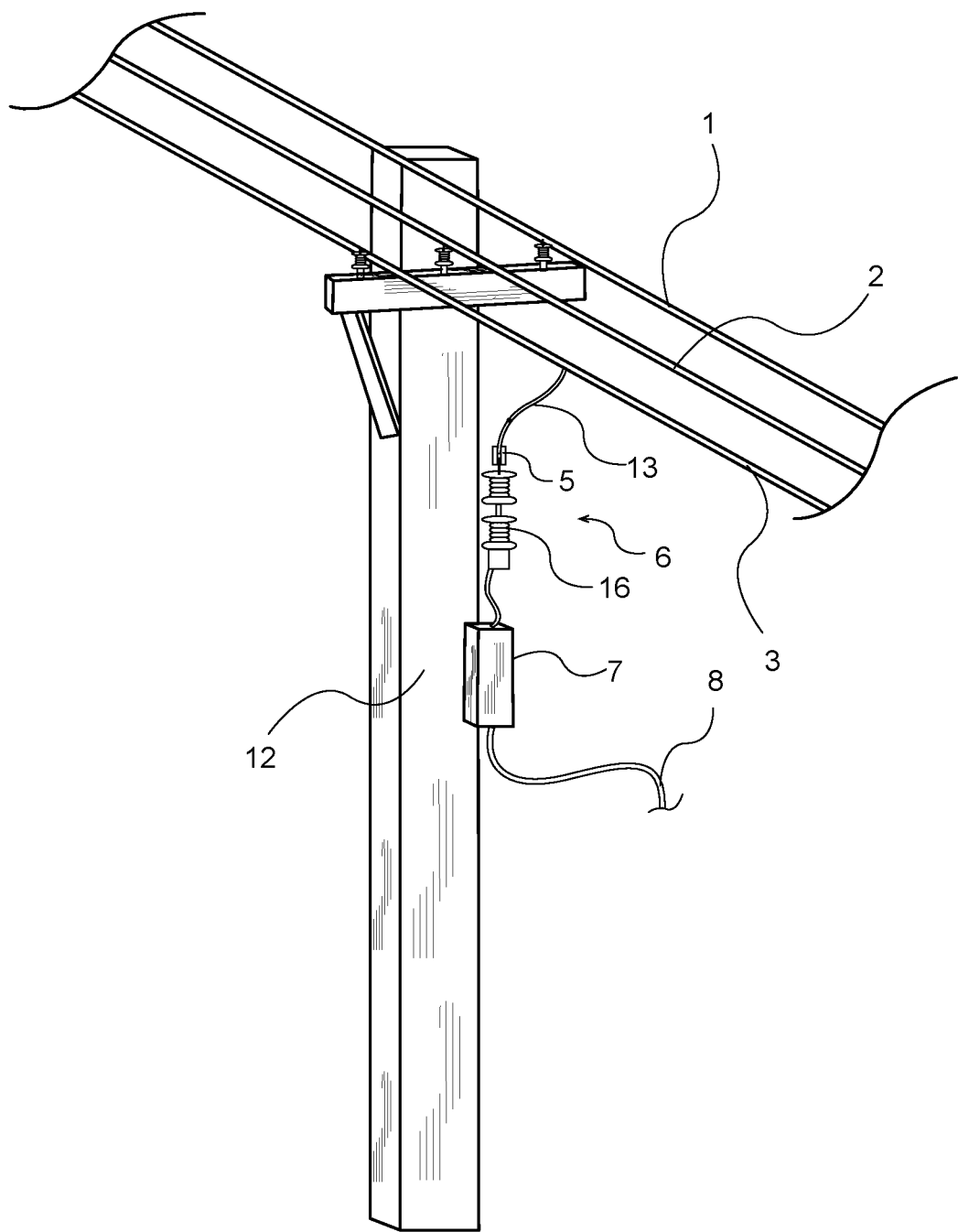
FIG. 1 represents an isometric view of a prior art cut-out switch 6 of power transmission system 10 installed in a post 12.
Figure 2:
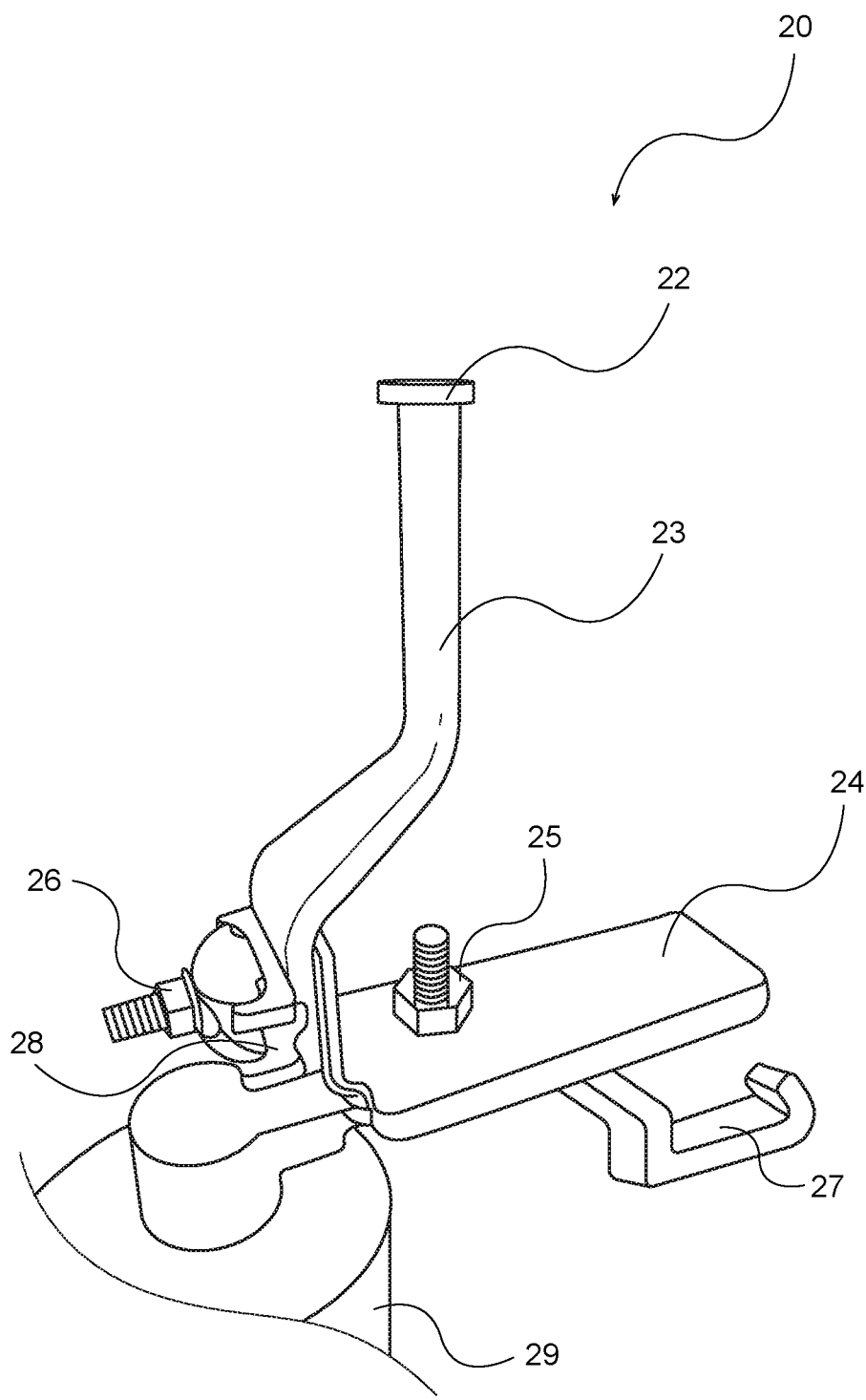
FIG. 2 demonstrates isometric view of the power line cutout switch 20 of present invention comprising a vertical extension member 23 with mushroom top member 22 to secure a spring-loaded coil.
Figure 8:
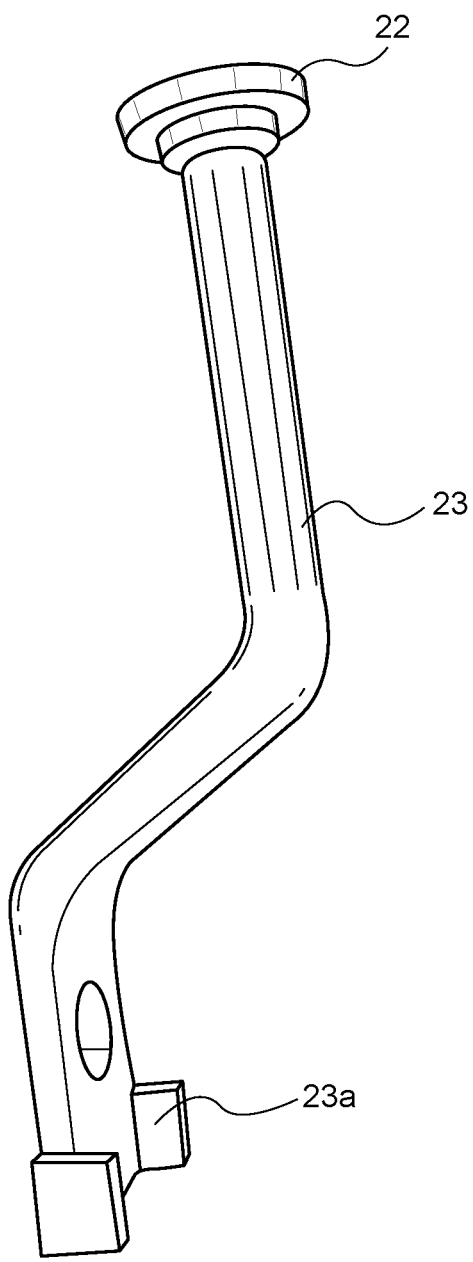
FIG. 8 shows an alternate embodiment of vertical extension member 23 having lateral flanges 23*a* used to stabilize it in the upright position.

Referring now to the drawings, FIG. 2 demonstrates isometric view of the power line cutout switch 20 of present invention. Power line cutout switch 20 comprises a base member 24 having a vertical extension member 23 perpendicularly attached thereon. Optionally, a mushroom top member 22 can be located at distal end of vertical extension member 23. Mushroom top member 22 is used to further secure mechanical jumper 21, while moving power lines from an old post to new post. Mechanical jumper 21 includes a clamp at its distal end that is used to mount mechanical jumper 21 to vertical extension member 23. In one embodiment, mechanical jumper 21 can be clamped below mushroom top member 22. Suitable securing means 25 can be included to hold the tongue fuse contact member 27 extending towards the front of base member 24 as shown in FIG. 2. It should be understood that base member 24 may have a proximal end and a distal end. At the proximal end, base member 24 may include a proximal wall. The proximal wall, as seen in FIG. 2, may be extending from base member 24. Vertical extension member 23 may include a bottom section, a curved intermediary section that curves towards the distal end of base member 24 and a top section that is vertical and parallel with the bottom section as seen in FIG. 8. Vertical extension member 23 may also include an opening, as seen in FIG. 8, that allows for vertical extension member 23 to be mounted and secured to the proximal wall of base member 24 with a fastening member 26, as can be seen in FIG. 2. It should be understood that fastening member 26 may extend through the opening of vertical extension member 23 to secure vertical extension member 23 to the proximal wall of base member 24. The bottom section of vertical extension member 23 may be flush with the proximal wall when secured thereto.

Solid jumper 34 can be connected to the cutout switch using clamp 28 using fastening member 26, not limited to bolt and nut arrangement, as shown in FIG. 2. Mechanical jumper 21 can be insulated to provide safety when operating near or with high voltage transmission lines. The electrical power can be transmitted from power line cutout switch 20 to transformer for power transmission to customers. Power line cutout switch 20 can be insulated using suitable means of insulation 29.

Figure 3:
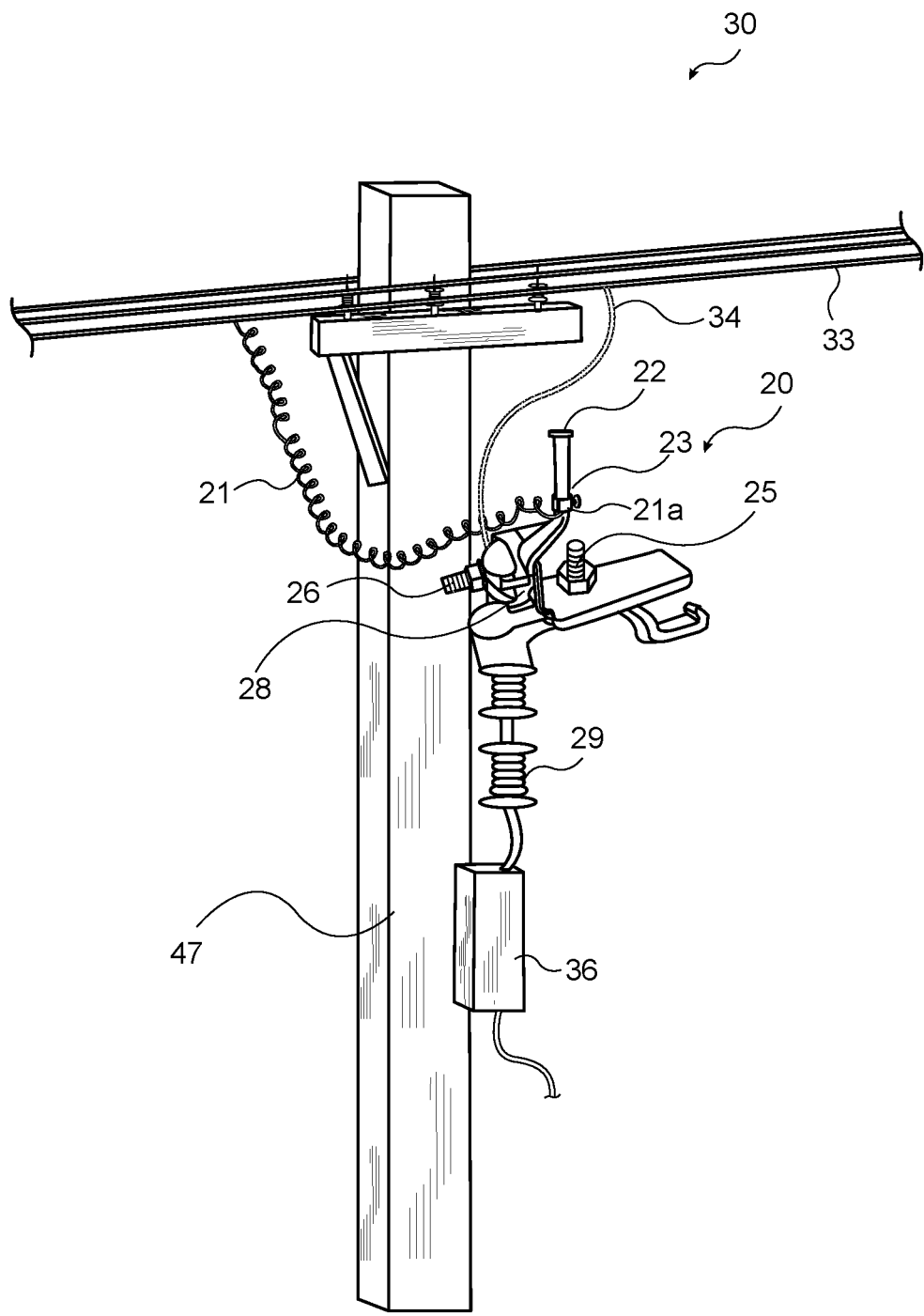
FIG. 3 demonstrates isometric view of power transmission system 30 using power line cutout switch 20 of FIG. 2 in a post 47. The vertical extension member 23 with mushroom top member 22 secures a spring-loaded coil, when post 47 is to be replaced with new post or to be relocated in other location. The solid jumper 34 connected to transmission line 33 is also shown.

FIG. 3 demonstrates isometric view of power transmission system 30 using cutout switch 20 of FIG. 2 in post 47. As shown in FIG. 3, the solid jumper 34 is secured to the clamp 28 using fastening member 26, and then connected to transmission line 33 which is ultimately connected to transformer 36. The post 47 is considered as old post 47 when it needs to be relocated or to be replaced. When post 47 is to be replaced with new post or to be relocated to other location, mechanical jumper 21 is mounted to vertical extension member 23 using a clamp 21*a* at its distal end that provides a solid structure for mechanical jumper 34 to mount to.

It should be noted that, at the time of installing a new post or at the time of replacing old post 47, mechanical jumper 21 is secured to vertical extension member 23 instead of mounting to solid jumper 34. This avoids electrocution or power interruption if the solid jumper 34 is damaged with the weight or pulling forces exerted upon mechanical jumper 21 when moving the power lines form post to post. Through power line cutout switch 20, power from transmission line 33 may be supplied to transformer 36 and can be transferred to customers.

Figure 4:
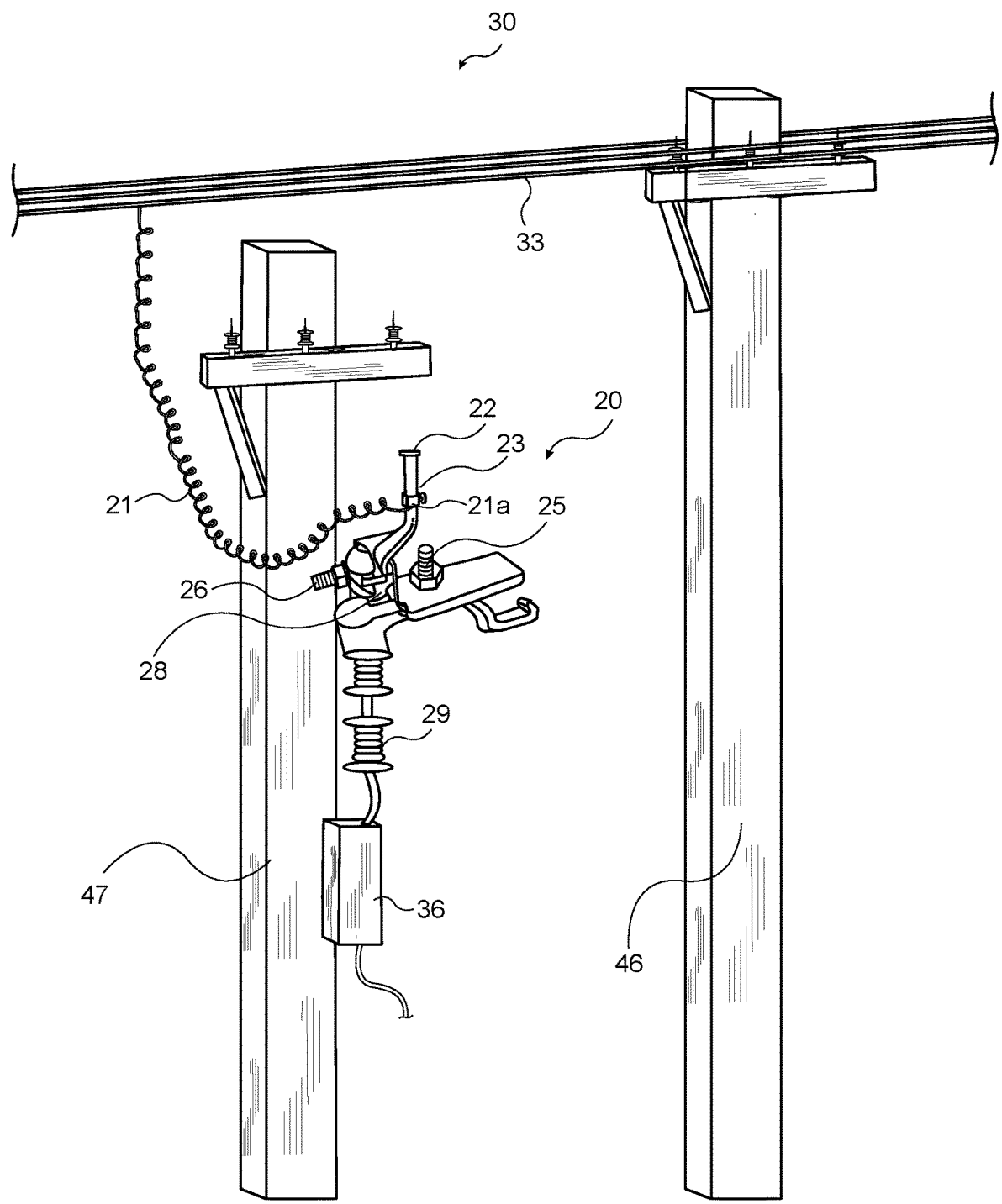
FIG. 4 demonstrates isometric view of power transmission system 30 of FIG. 3, where the solid jumper 34 is detached from transmission line 33. The mechanical jumper 21 can supply power to customers until new post 46 is installed. The new post 46 is much higher than the old post 47. The mechanical jumper 21 connected to transmission line 33 can extend according to height of new post 46.

FIG. 4 demonstrates isometric view of power transmission system 30 of FIG. 3, where the solid jumper 34 is detached/disconnected from transmission line 33. After disconnecting solid jumper 34, new post 46 can be installed next to old post 47 as shown. Mechanical jumper 21 secured to vertical extension member 23 using clamp 21*a* on one end and on the other end is connected to the high voltage power lines. When switching from old post 47 to new post 46 mechanical jumper 21 is first connected between the cutout switch and the high voltage power line. The solid jumper is still connected to both the cutout switch and the high voltage power line. Thus, mechanical jumper 21 and solid jumper 34 are initially connected in parallel. The current is then passing through both. The solid jumper 34 is then removed or cut so that the current is temporarily only passing through the mechanical jumper 21 during the post changing. The mechanical jumper 21 then stretches to accommodate new post 46 while still sending power to transformer 36 to avoid power interruption. The new post 46 can be higher or lower than the old post 47, so mechanical jumper 21 is usually longer and more flexible than solid jumper 34.

Figure 5:
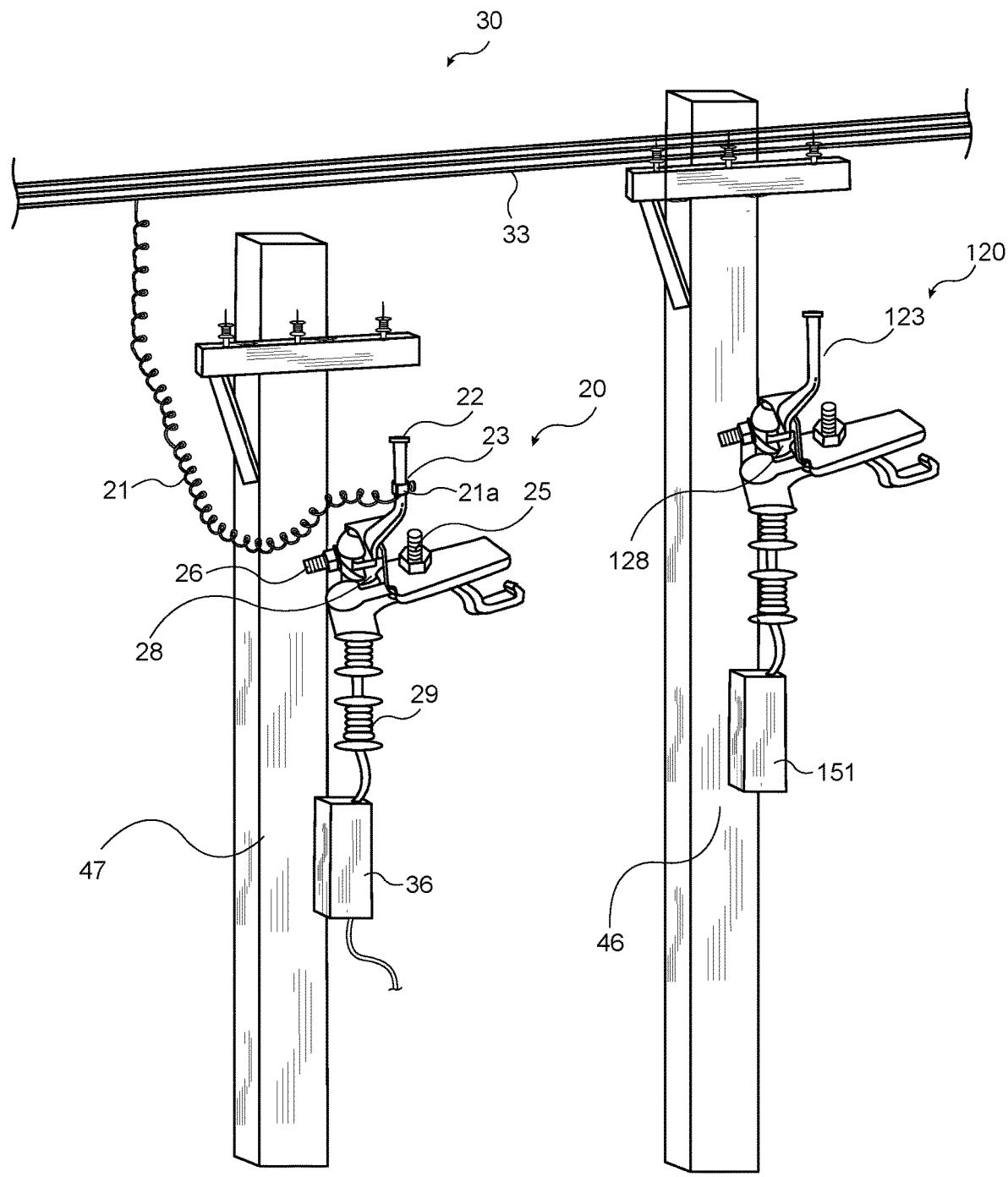
FIG. 5 demonstrates isometric view of power transmission system 30 of FIG. 4, where new power line cutout switch 120 is installed in new post 46.
Figure 6:
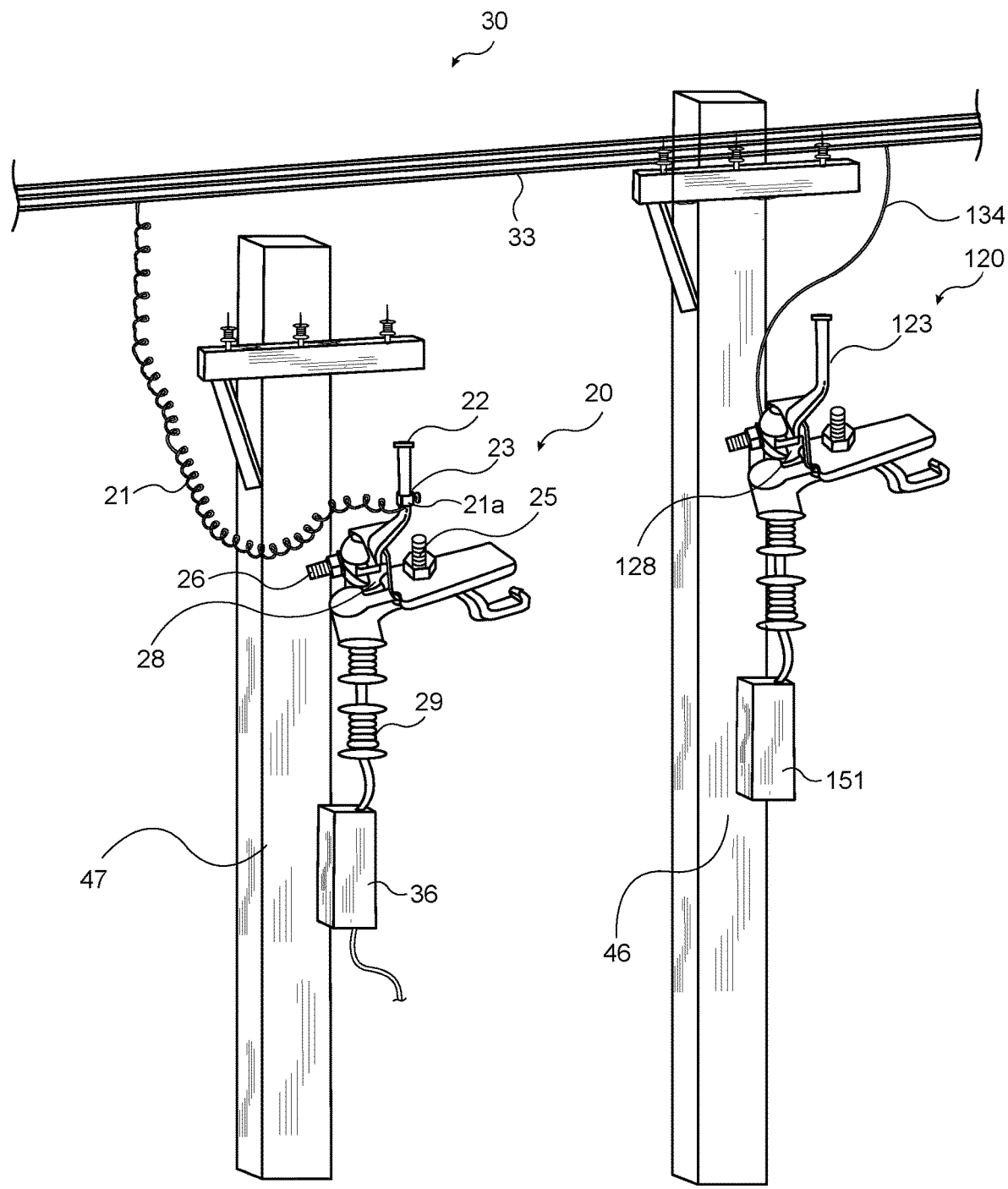
FIG. 6 demonstrates isometric view of power transmission system 30 of FIG. 5, one end of new solid jumper 134 is connected to power transmission line 33 and other end fitted to new power line cutout switch 120 using claim 128.
Figure 7:
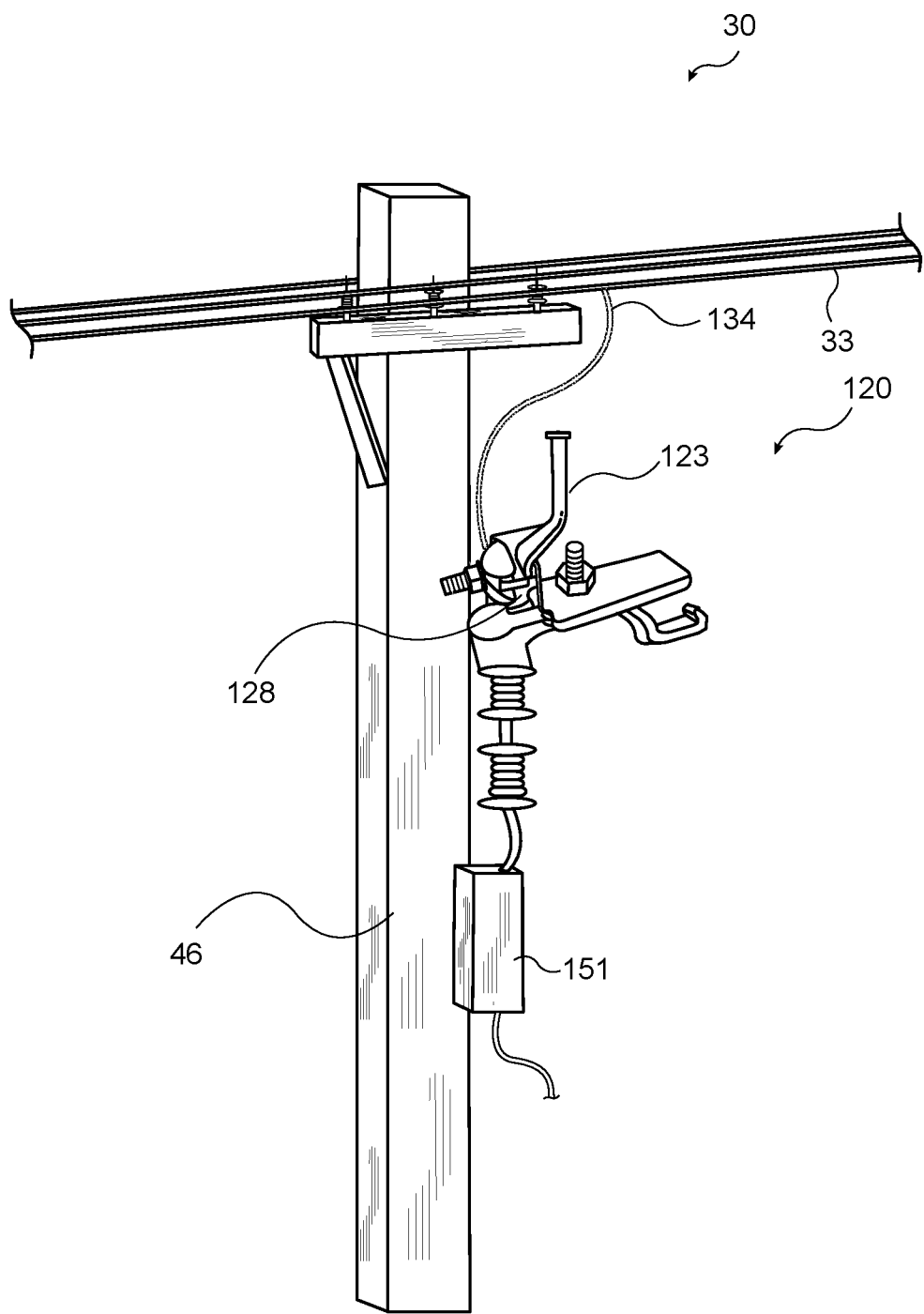
FIG. 7 demonstrates isometric view of power transmission system 30 of FIG. 6 with new power line cutout switch 120 and new solid jumper 134 in new post 46. The old post 47, old power line cutout switch 20 and old mechanical jumper 21 are removed after complete installation of new post 46. This prevent interruption of power supply while changing post.

As shown in FIG. 5, a new cutout switch 120 is mounted to new post 46 and has the same components of the present invention. The new solid jumper 134 and new cutout switch 120 with clamp 128 and vertical extension member 123 as shown in FIGS. 5-7. The new cutout switch 120 includes a new solid jumper 134 as shown in FIG. 6 that is connected to the power lines 33 once they are placed over the new post 46. Transformer 36 is then shut off and mechanical jumper 21 finished its function of preserving power supply during the transfer and can now be removed. Now there is a brief power interruption between the time the old transformer 36 is turned off and the new transformer 151, being fed through new solid jumper 134, is turned on.

Once new post 46 is installed near/at a distance away from old post 47, as shown in FIGS. 5-7, new power line cutout switch 120 is used with new post 46 and connected to new transformer 151. Then, as shown in FIG. 7, new solid jumper 134 can be connected back to new clamp 128 of power line cutout switch 120 and mechanical jumper 21 secured to vertical extension member 23 can be disconnected. The new solid jumper 134 connected to clamp 128 and transmission line 33, supplies power to customers using new post 46. FIG. 8 shows an alternate embodiment of vertical extension member 23 having lateral flanges 23a used to stabilize it in the upright position.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A power line cut-out switch used in a power transmission system, comprising:
   a) a base member having a proximal end having a proximal wall, said base member includes a distal end;
   b) a vertical extension member mounted to said proximal wall, said vertical extension member having a vertical extension height, said proximal wall having a proximal wall height, said vertical extension member includes a bottom section flush with said proximal wall, said vertical extension member includes a curved intermediary section that curves towards said distal end of said base member, and a top section that is vertical and parallel with said bottom section;
   c) said vertical extension height being greater than said proximal wall height;
   d) a fastening member that secures said vertical extension member to said proximal wall; and
   e) said vertical extension member is configured to secure a mechanical jumper thereon.

2. The power line cutout switch of claim 1 wherein said proximal wall is parallel and flush to said vertical extension member.

3. The power line cutout switch of claim 1 wherein said fastening member is a screw.

4. The power line cutout switch of claim 1 wherein said vertical extension member includes two lateral flanges and a bottom distal end, said two lateral flanges mounted to said bottom distal end opposite each other and adapted to provide greater stability to said vertical extension member.

5. The power line cutout switch of claim 1 wherein a mushroom top member is positioned at the distal end of said vertical extension member.

6. A power line cut-out switch used in a power transmission system, comprising:
   a) a base member having a proximal end having a proximal wall, said base member includes a distal end;
   b) a vertical extension member mounted to said proximal wall, said vertical extension member having a vertical extension height, said proximal wall having a proximal wall height, said vertical extension member includes a bottom section flush with said proximal wall, said vertical extension member includes a curved intermediary section that curves towards said distal end of said base member, and a top section that is vertical and parallel with said bottom section; and
   c) a fastening member that secures said vertical extension member to said proximal wall.

7. The power line cutout switch of claim 6, wherein said vertical extension member has a vertical extension height and said proximal wall has a proximal wall height, said vertical extension height is greater than said proximal wall height.

8. The power line cutout switch of claim 6, said vertical extension member is configured to secure a mechanical jumper thereon.

* * * * *